(12) United States Patent
Cheng et al.

(10) Patent No.: US 10,679,063 B2
(45) Date of Patent: Jun. 9, 2020

(54) RECOGNIZING SALIENT VIDEO EVENTS THROUGH LEARNING-BASED MULTIMODAL ANALYSIS OF VISUAL FEATURES AND AUDIO-BASED ANALYTICS

(71) Applicant: SRI International, Menlo Park, CA (US)

(72) Inventors: Hui Cheng, Bridgewater, NJ (US); Ajay Divakaran, Monmouth Junction, NJ (US); Elizabeth Shriberg, Menlo Park, CA (US); Harpreet Singh Sawhney, Princeton, NJ (US); Jingen Liu, Plainsboro, NJ (US); Ishani Chakraborty, Franklin Park, NJ (US); Omar Javed, Franklin Park, NJ (US); David Chisolm, Menlo Park, CA (US); Behjat Siddiquie, Plainsboro, NJ (US); Steven S. Weiner, Merion Station, PA (US)

(73) Assignee: SRI International, Menlo Park, CA (US)

( * ) Notice: Subject to any disclaimer, the term of this patent is extended or adjusted under 35 U.S.C. 154(b) by 880 days.

(21) Appl. No.: 14/846,318

(22) Filed: Sep. 4, 2015

(65) Prior Publication Data

US 2016/0004911 A1 Jan. 7, 2016

Related U.S. Application Data

(63) Continuation of application No. 14/332,071, filed on Jul. 15, 2014, which is a continuation of application (Continued)

(51) Int. Cl.
*G06K 9/00* (2006.01)
*H04N 21/44* (2011.01)
(Continued)

(52) U.S. Cl.
CPC ......... *G06K 9/00718* (2013.01); *G06F 16/43* (2019.01); *G06F 16/78* (2019.01);
(Continued)

(58) Field of Classification Search
CPC ......... H04N 21/4402; H04N 21/44029; H04N 21/44008; H04N 21/4394; H04N 21/439;
(Continued)

(56) References Cited

U.S. PATENT DOCUMENTS 6,564,263 B1 * 5/2003 Bergman .................. G06K 9/00
709/231
7,869,658 B2 * 1/2011 Blose ....................... G06F 16/51
382/224

(Continued)

OTHER PUBLICATIONS

Ba Tu Truong and Svetha Venkatesh, Video Abstraction: A Systematic Review and Classification, ACM Trans. Multimedia Comput. Commun. Appl. 3,1, Article 3 (Feb. 2007).

*Primary Examiner* — James R Sheleheda
(74) *Attorney, Agent, or Firm* — Moser Taboada

(57) ABSTRACT

A computing system for recognizing salient events depicted in a video utilizes learning algorithms to detect audio and visual features of the video. The computing system identifies one or more salient events depicted in the video based on the audio and visual features.

21 Claims, 6 Drawing Sheets

Related U.S. Application Data

No. 13/737,607, filed on Jan. 9, 2013, now Pat. No. 9,244,924.

(60) Provisional application No. 61/637,196, filed on Apr. 23, 2012, provisional application No. 62/156,425, filed on May 4, 2015.

(51) Int. Cl.
| | |
|---|---|
| *H04N 21/8549* | (2011.01) |
| *G11B 27/10* | (2006.01) |
| *G11B 27/031* | (2006.01) |
| *G06F 16/43* | (2019.01) |
| *G06F 16/78* | (2019.01) |
| *H04N 21/4402* | (2011.01) |
| *H04N 21/233* | (2011.01) |
| *H04N 21/234* | (2011.01) |
| *H04N 21/439* | (2011.01) |

(52) U.S. Cl.
CPC ............ *G11B 27/031* (2013.01); *G11B 27/10* (2013.01); *H04N 21/233* (2013.01); *H04N 21/23418* (2013.01); *H04N 21/4394* (2013.01); *H04N 21/44008* (2013.01); *H04N 21/44029* (2013.01); *H04N 21/8549* (2013.01)

(58) Field of Classification Search
CPC ........... H04N 21/23418; H04N 21/233; H04N 21/8549; G06K 9/00718; G06K 2009/00738; G06F 16/43; G06F 16/78; G11B 27/031; G11B 27/10
See application file for complete search history.

(56) References Cited

U.S. PATENT DOCUMENTS

| | | | | |
|---|---|---|---|---|
| 8,051,446 | B1* | 11/2011 | Qian | G06F 16/738 |
| | | | | 725/39 |
| 8,339,456 | B2* | 12/2012 | Eledath | G06K 9/209 |
| | | | | 348/154 |
| 8,611,677 | B2* | 12/2013 | Das | G06K 9/00664 |
| | | | | 382/225 |
| 8,634,638 | B2* | 1/2014 | Han | G06K 9/00342 |
| | | | | 382/159 |
| 8,874,538 | B2* | 10/2014 | Mate | G06F 16/739 |
| | | | | 707/705 |
| 8,874,584 | B1* | 10/2014 | Chen | G06F 16/786 |
| | | | | 707/741 |
| 8,930,959 | B2* | 1/2015 | Lahr | G06F 9/5038 |
| | | | | 719/310 |
| 9,111,287 | B2* | 8/2015 | Liu | G06Q 30/02 |
| 9,129,158 | B1* | 9/2015 | Medasani | G06K 9/00335 |
| 9,436,875 | B2* | 9/2016 | Curcio | G06K 9/00718 |
| 2004/0130567 | A1* | 7/2004 | Ekin | A63B 24/0003 |
| | | | | 715/723 |
| 2005/0188328 | A1* | 8/2005 | Sezan | H04L 12/2805 |
| | | | | 715/789 |
| 2007/0101266 | A1* | 5/2007 | Kim | G11B 27/105 |
| | | | | 715/719 |
| 2007/0203942 | A1* | 8/2007 | Hua | G11B 27/105 |
| 2008/0304808 | A1* | 12/2008 | Newell | G11B 27/034 |
| | | | | 386/278 |
| 2008/0306995 | A1* | 12/2008 | Newell | G11B 27/034 |
| 2009/0087122 | A1* | 4/2009 | Xu | G06K 9/00744 |
| | | | | 382/277 |
| 2010/0070483 | A1* | 3/2010 | Delgo | G11B 27/034 |
| | | | | 707/706 |
| 2010/0142803 | A1* | 6/2010 | Wang | G06K 9/00718 |
| | | | | 382/160 |
| 2010/0272187 | A1* | 10/2010 | Civanlar | G11B 27/105 |
| | | | | 375/240.25 |
| 2011/0052000 | A1* | 3/2011 | Cobb | G06K 9/00335 |
| | | | | 382/103 |
| 2011/0055266 | A1* | 3/2011 | Varadarajan | G06F 16/583 |
| | | | | 707/780 |
| 2011/0243529 | A1* | 10/2011 | Oryoji | G06K 9/00744 |
| | | | | 386/248 |
| 2011/0320454 | A1* | 12/2011 | Hill | G06F 16/58 |
| | | | | 707/739 |
| 2012/0033949 | A1* | 2/2012 | Lu | G11B 27/034 |
| | | | | 386/285 |
| 2012/0060077 | A1* | 3/2012 | Mate | G06F 16/739 |
| | | | | 715/200 |
| 2012/0123780 | A1* | 5/2012 | Gao | H04N 21/44016 |
| | | | | 704/245 |
| 2012/0123978 | A1* | 5/2012 | Toderice | G06K 9/00744 |
| | | | | 706/12 |
| 2012/0179642 | A1* | 7/2012 | Sweeney | G06F 17/2785 |
| | | | | 706/55 |
| 2013/0014016 | A1* | 1/2013 | Delgo | G11B 27/28 |
| | | | | 715/723 |
| 2013/0243407 | A1* | 9/2013 | Kashima | G06K 9/00711 |
| | | | | 386/343 |
| 2013/0282747 | A1* | 10/2013 | Cheng | G06F 16/73 |
| | | | | 707/758 |
| 2013/0335635 | A1* | 12/2013 | Ghanem | G01S 3/7865 |
| | | | | 348/659 |
| 2013/0343727 | A1* | 12/2013 | Rav-Acha | G11B 27/031 |
| | | | | 386/282 |
| 2014/0161354 | A1* | 6/2014 | Curcio | G06K 9/00718 |
| | | | | 382/190 |
| 2014/0185937 | A1* | 7/2014 | Brown | G06K 9/00369 |
| | | | | 382/195 |
| 2014/0212002 | A1* | 7/2014 | Curcio | G06K 9/00744 |
| | | | | 382/107 |
| 2014/0279764 | A1* | 9/2014 | Lahr | G06F 9/5038 |
| | | | | 706/12 |
| 2014/0324864 | A1* | 10/2014 | Choe | G06F 16/71 |
| | | | | 707/737 |
| 2014/0328511 | A1* | 11/2014 | Fan | G06K 9/0063 |
| | | | | 382/103 |
| 2014/0328570 | A1* | 11/2014 | Cheng | G11B 27/10 |
| | | | | 386/241 |
| 2015/0082349 | A1* | 3/2015 | Ishtiaq | H04N 21/23418 |
| | | | | 725/40 |
| 2015/0302894 | A1* | 10/2015 | Boiman | G11B 27/031 |
| | | | | 386/285 |
| 2016/0004911 | A1* | 1/2016 | Cheng | G11B 27/10 |
| | | | | 382/159 |
| 2016/0012293 | A1* | 1/2016 | Mate | G06F 16/70 |
| | | | | 382/100 |
| 2016/0028999 | A1* | 1/2016 | Ptucha | H04N 5/232 |
| | | | | 348/207.1 |
| 2016/0034786 | A1* | 2/2016 | Suri | G06K 9/6256 |
| | | | | 382/159 |
| 2016/0042252 | A1* | 2/2016 | Sawhney | G06F 16/583 |
| | | | | 382/190 |
| 2016/0042253 | A1* | 2/2016 | Sawhney | G06F 16/583 |
| | | | | 382/190 |
| 2016/0055885 | A1* | 2/2016 | Hodulik | G06K 9/00751 |
| | | | | 386/241 |
| 2016/0110433 | A1* | 4/2016 | Sawhney | G06F 16/9535 |
| | | | | 707/722 |
| 2016/0179933 | A1* | 6/2016 | Dimassimo | G06F 16/248 |
| | | | | 707/711 |
| 2016/0314121 | A1* | 10/2016 | Arroyo | G06N 5/02 |
| 2016/0342842 | A1* | 11/2016 | Dunlop | G06K 9/00718 |
| 2017/0257474 | A1* | 9/2017 | Rhoads | H04N 5/23245 |
| 2017/0357878 | A1* | 12/2017 | Sawhney | G06F 16/583 |
| 2019/0012577 | A1* | 1/2019 | Lahr | G06N 20/00 |
| 2019/0377951 | A1* | 12/2019 | Eaton | G06K 9/00335 |

* cited by examiner

RECOGNIZING SALIENT VIDEO EVENTS THROUGH LEARNING-BASED MULTIMODAL ANALYSIS OF VISUAL FEATURES AND AUDIO-BASED ANALYTICS

CROSS-REFERENCE TO RELATED APPLICATIONS

This application claims priority to and the benefit of U.S. Utility patent application Ser. No. 14/332,071, filed Jul. 15, 2014, which claims priority to and the benefit of U.S. Utility patent application Ser. No. 13/737,607, filed Jan. 9, 2013, which claims priority to and the benefit of U.S. Provisional Patent Application Ser. No. 61/637,196, filed Apr. 23, 2012; and this application also claims priority to and the benefit of U.S. Provisional Patent Application Ser. No. 62/156,425, filed May 4, 2015; and each of the foregoing applications is incorporated herein by this reference in its entirety.

GOVERNMENT RIGHTS

This invention was made in part with government support under NBC contract no. D11PC20066 awarded by the Department of the Interior and contract no. W911NF-12-C-0028 awarded by the Defense Advanced Research Projects Agency (DARPA). The United States Government has certain rights in this invention.

BACKGROUND

With the integration of digital video recording technology into more and more consumer-oriented electronic devices, visual content (e.g., digital photos and videos) is frequently captured, viewed, and shared by mobile device applications, instant messaging and electronic mail, social media services, and other electronic communication methods.

In computer vision, mathematical techniques are used to detect the presence of and recognize various elements of the visual scenes that are depicted in digital images. Localized portions of an image, known as features, may be used to analyze and classify the image. Low-level features, such as interest points and edges, may be computed from an image and used to detect, for example, people, objects, and landmarks that are depicted in the image. Machine learning algorithms are often used for image recognition.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
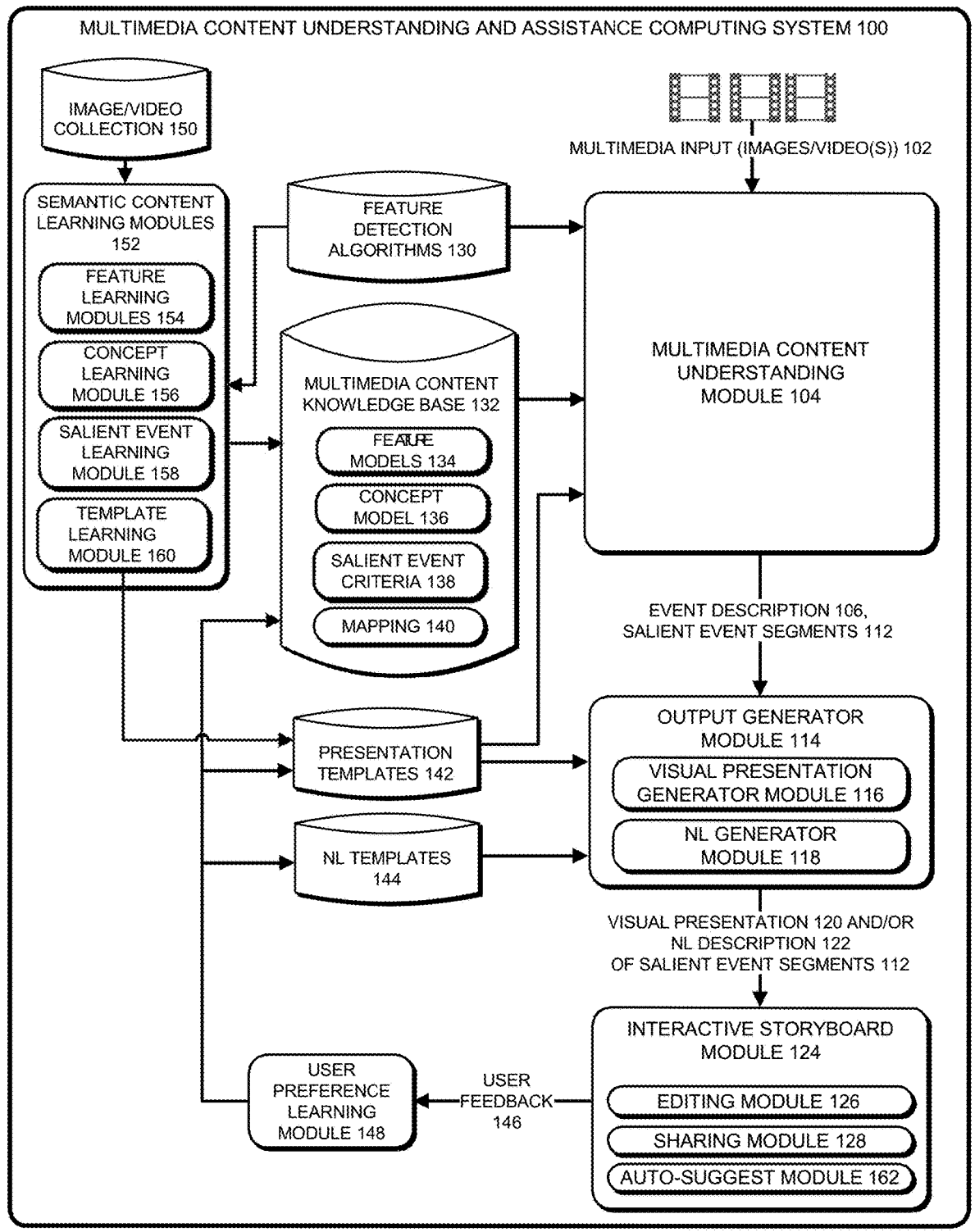
FIG. 1 is a simplified schematic diagram of an environment of at least one embodiment of a multimedia content understanding and assistance computing system including a multimedia content understanding module as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

The use of visual content, e.g., digital images and video, as a communication modality is becoming increasingly common. Mobile cameras are used to capture not just special holidays and important events, but also to record other, relatively mundane yet entertaining or otherwise memorable scenes and activities that are more difficult to classify. For instance, a picture or video of a child's impromptu imitation of a family member, a trick performed by a pet, or a humorous interaction involving a group of friends may be very meaningful to the camera holder and/or worthy of sharing with others, but difficult to describe or "tag" with words in a way that would facilitate retrieval of the image at a later time. Even with visual content that is more easily categorized, such as footage of weddings and birthdays, it can be very difficult and time-consuming for the user to manually identify and locate the most interesting or important scenes, particularly when the collection of images or video is very large. Further, where the collection contains multiple images of the same scene, it can be challenging for users to discern the one or two specific images that represent the "best" depictions of the scene.

Referring now to FIG. 1, an embodiment of a multimedia content understanding and assistance computing system 100 is shown in the context of an environment that may be created during the operation of the system 100 (e.g., a physical and/or virtual execution or "runtime" environment). The illustrative multimedia content understanding and assistance computing system 100 is embodied as a number of machine-readable instructions, modules, data structures and/or other components, which may be implemented as computer hardware, firmware, software, or a combination thereof. For ease of discussion, the multimedia content understanding and assistance computing system 100 may be referred to herein as a "visual content assistant," a "video assistant," an "image assistant," a "multimedia assistant," or by similar terminology.

The computing system 100 executes computer vision algorithms, including machine learning algorithms, semantic reasoning techniques, and/or other technologies to, among other things, in an automated fashion, identify, understand, and describe events that are depicted in multimedia input 102. As described in more detail below, the illustrative computing system 100 can, among other things, help users quickly and easily locate "salient activities" in lengthy and/or large volumes of video footage, so that the most important or meaningful segments can be extracted, retained and shared. The computing system 100 can compile the salient event segments into a visual presentation 120 (e.g., a "highlight reel" video clip) that can be stored and/or shared over a computer network. For instance, embodiments of the computing system 100 can extract multiple salient events from the footage and (i) fuse (or concatenate) two or more of the extracted salient events to create a single highlight and/or (ii) fuse (or concatenate) multiple salient events (including "complex" salient events that are themselves made up of multiple salient events) to create a composite highlights reel. The system 100 can, alternatively or in addition, generate a natural language (NL) description 122 of the multimedia input 102, which describes the content of the input 102 in a manner that can be used for, among other things, searching, retrieval, and establishing links between the input 102 and other electronic content (such as text or voice input, advertisements, other videos, documents, or other multimedia content).

The events that can be automatically detected and described by the computing system 100 include "complex events." As used herein, "complex event" may refer to, among other things, an event that is made up of multiple "constituent" people, objects, scenes and/or activities. For example, a birthday party is a complex event that can include multiple activities, such as singing, blowing out candles, opening presents, and eating cake. Similarly, a child acting out an improvisation is a complex event that may include people smiling, laughing, dancing, drawing a picture, and applause. In some cases, one or more of the constituent activities may itself be a complex activity or event. For example, the activity of opening presents is made up of multiple constituent activities, such as tearing paper, untying a ribbon, opening a box, pulling an item out of a bag or box, looking at the item, smiling, etc. A group activity relating to a political issue, sports event, or music performance is a complex event that may involve a group of people walking or standing together, a person holding a sign, written words on the sign, a person wearing a t-shirt with a slogan printed on the shirt, and human voices shouting. Other examples of complex events include human interactions with other people (e.g., conversations, meetings, presentations, etc.) and human interactions with objects (e.g., cooking, repairing a machine, conducting an experiment, building a house, etc.). The activities that make up a complex event are not limited to visual features. Rather, "activities" as used herein may refer to, among other things, visual, audio, and/or text features, which may be detected by the computing system 100 in an automated fashion using a number of different algorithms and feature detection techniques, as described in more detail below. Stated another way, an activity as used herein may refer to any semantic element of the multimedia input 102 that, as determined by the computing system 100, evidences an event.

As used herein, "multimedia input" may refer to, among other things, a collection of digital images, a video, a collection of videos, or a collection of images and videos (where a "collection" includes two or more images and/or videos). References herein to a "video" may refer to, among other things, a relatively short video clip, an entire full-length video production, or different segments within a video or video clip (where a segment includes a sequence of two or more frames of the video). Any video of the input 102 may include or have associated therewith an audio soundtrack (which may include speech and/or non-speech audio), and/or a speech transcript, where the speech transcript may be generated by, for example, an automated speech recognition (ASR) module of the computing system 100. Any video or image of the input 102 may include or have associated therewith a text transcript, where the text transcript may be generated by, for example, an optical character recognition (OCR) module of the computing system 100. References herein to an "image" may refer to, among other things, a still image (e.g., a digital photograph) or a frame of a video (e.g., a "key frame").

A multimedia content understanding module 104 of the computing system 100 is embodied as software, firmware, hardware, or a combination thereof. The multimedia content understanding module 104 applies a number of different feature detection algorithms 130 to the multimedia input 102, using a multimedia content knowledge base 132, and generates an event description 106 based on the output of the algorithms 130. The multimedia knowledge base 132 is embodied as software, firmware, hardware, or a combination thereof (e.g., as a database, table, or other suitable data structure or computer programming construct). The illustrative multimedia content understanding module 104 executes different feature detection algorithms 130 on different parts or segments of the multimedia input 102 to detect different features, or the multimedia content understanding module 104 executes all or a subset of the feature detection algorithms 130 on all portions of the multimedia input 102. Some examples of feature detection algorithms and techniques, including low-level, mid-level, and complex event detection and recognition techniques, are described in the priority application, Cheng et al., U.S. Utility patent application Ser. No. 13/737,607 ("Classification, Search, and Retrieval of Complex Video Events"); and also in Chakraborty et al., U.S. Utility patent application Ser. No. 14/021,696, filed Sep. 9, 2013 ("Recognizing Entity Interactions in Visual Media"), Chakraborty et al., U.S. Utility patent application Ser. No. 13/967,521, filed Aug. 15, 2013 ("3D Visual Proxemics: Recognizing Human Interactions in 3D from a Single Image"), Han et al., U.S. Pat. No. 8,634,638 ("Real-Time Action Detection and Classification"), Eledath et al., U.S. Pat. No. 8,339,456 ("Apparatus for Intelligent and Autonomous Video Content and Streaming"), all of SRI International and each of which is incorporated herein by this reference. Additionally, technologies for visual feature detection and indexing are disclosed in Sawhney, Harpreet S. et al., U.S. Utility patent application Ser. No. 14/452,237, filed Aug. 5, 2014 ("Multi-Dimensional Realization of Visual Content of an Image Collection").

The event description 106 semantically describes an event depicted by the multimedia input 102, as determined by the multimedia content understanding module 104. In the illustrative embodiments, the event description 106 is determined algorithmically by the computing system 100 analyzing the multimedia input 102. In other embodiments, the event description 106 may be user-supplied or determined by the system 100 based on meta data or other descriptive information associated with the input 102. The illustrative event description 106 generated by the understanding module 104 indicates an event type or category, such as "birthday party," "wedding," "soccer game," "hiking trip," or "family activity." The event description 106 may be embodied as, for example, a natural language word or phrase that is encoded in a tag or label, which the computing system 100 associates with the multimedia input 102 (e.g., as an extensible markup language or XML tag). Alternatively or in addition, the event description 106 may be embodied as structured data, e.g., a data type or data structure including semantics, such as "Party(retirement)," "Party(birthday)," "Sports_Event(soccer)," "Performance(singing)," or "Performance(dancing)."

To generate the event description 106, the illustrative multimedia content understanding module 104 accesses one or more feature models 134 and/or concept models 136. The feature models 134 and the concept models 136 are embodied as software, firmware, hardware, or a combination thereof, e.g., a knowledge base, database, table, or other suitable data structure or computer programming construct. The models 134, 136 correlate semantic descriptions of audio, visual, text, etc. features and concepts with instances or combinations of output of the algorithms 130 that evidence those features and concepts. For example, the feature models 134 may define relationships between sets of low level features detected by the algorithms 130 with semantic descriptions of those sets of audio, visual, text, etc. features (e.g., visual concept descriptions such as "object," "person," "face," "ball," "vehicle," and audio concept descriptions such as "happy", "annoyed," "excited," "calm," etc.). Similarly, the concept model 136 may define relationships between sets of features detected by the algorithms 130 and higher-level concepts, such as people, objects, actions, configurations, poses and their spatial, temporal and semantic relationships (e.g., "sitting," "running," "throwing," "cheering," "fighting," etc.). The semantic descriptions of features and concepts that are maintained by the models 134, 136 may be embodied as natural language descriptions and/or structured data. As described in more detail below with reference to FIG. 4, a mapping 140 of the knowledge base 132 indicates relationships between various combinations of features, concepts, events, and activities. As described below, the event description 106 can be determined using semantic reasoning in connection with the knowledge base 132 and/or the mapping 140. To establish "relationships" and "associations" as described herein, the computing system 100 may utilize, for example, a knowledge representation language or ontology.

The computing system 100 uses the event description 106 and the knowledge base 132 to determine one or more "salient" activities that are associated with the occurrence of the detected event. To do this, the computing system 100 may access salient event criteria 138 and/or the mapping 140 of the knowledge base 132. The illustrative salient event criteria 138 indicate one or more criteria for determining whether an activity is a salient activity in relation to one or more events. For instance, the salient event criteria 138 identify salient activities and the corresponding audio, visual, text, etc. feature detection information that the computing system 100 needs in order to algorithmically identify those salient activities in the input 102 (where the feature detection information may include, for example, parameters of computer vision algorithms 130). In some embodiments, the salient event criteria 138 includes saliency indicators 238 (FIG. 2), which indicate, for particular salient activities, a variable degree of saliency associated with the activity as it relates to a particular event. A salient event criterion 138 may be embodied as, for example, one or more per-defined, selected, or computed data values. A saliency indicator 238 may be embodied as, for example, a pre-defined, selected, or computed data value, such as a priority, a weight or a rank that can be used to arrange or prioritize the salient event segments 112.

The mapping 140 of the knowledge base 132 links activities with events, so that, once the event description 106 is determined, the understanding module 104 can determine the activities that are associated with the event description 106 and look for those activities in the input 102. The mapping 140 may establish one-to-one, one-to-many, or many-to-many logical relationships between the various events and activities in the knowledge base 132. For example, the activity of "singing" may be associated with "party" events and "performance" events while the activity of "blowing out candles" may be only associated with the event of "birthday party." In general, the mapping 140 and the various other portions of the knowledge base 132 can be configured and defined according to the requirements of a particular design of the computing system 100 (e.g., according to domain-specific requirements).

Once the salient activities are determined, the computing system 100 executes one or more algorithms 130 to identify particular portions or segments of the multimedia input 102 that depict those salient activities. As an example, if the computing system 100 determines that the multimedia input 102 depicts a birthday party (the event), the illustrative multimedia content understanding module 104 accesses the multimedia content knowledge base 132 to determine the constituent activities that are associated with a birthday party (e.g., blowing out candles, etc.), and selects one or more of the feature detection algorithms 130 to execute on the multimedia input 102 to look for scenes in the input 102 that depict those constituent activities. The understanding module 104 executes the selected algorithms 130 to identify salient event segments 112 of the input 102, such that the identified salient event segments 112 each depict one (or more) of the constituent activities that are associated with the birthday party.

Once the computing system 100 has identified the portions or segments of the multimedia input 102 that depict the salient activities, an output generator module 114 of the computing system 100 can do a number of different things with the salient activity information. The output generator module 114 and its submodules, a visual presentation generator module 116 and a natural language generator module 118, are each embodied as software, firmware, hardware, or a combination thereof.

The visual presentation generator module 116 of the output generator module 114 automatically extracts (e.g., removes or makes a copy of) the salient event segments 112 from the input 102 and incorporates the extracted segments 112 into a visual presentation 120, such as a video clip (e.g., a "highlight reel") or multimedia presentation, using a presentation template 142. In doing so, the visual presentation generator module 116 may select the particular presentation template 142 to use to create the presentation 120 based on a characteristic of the multimedia input 102, the event description 106, user input, domain-specific criteria, and/or other presentation template selection criteria.

The natural language generator module 118 of the output generator module 114 automatically generates a natural language description 122 of the event 106, including natural language descriptions of the salient event segments 112 and suitable transition phrases, using a natural language template 144. In doing so, the natural language presentation generator module 118 may select the particular natural language template 144 to use to create the NL description 122 based on a characteristic of the multimedia input 102, the event description 106, user input, domain-specific criteria, and/or other NL template selection criteria. An example of a natural language description 122 for a highlight reel of a child's birthday party, which may be output by the NL generator module 118, may include: "Child's birthday party, including children playing games followed by singing, blowing out candles, and eating cake." Some examples of methods for generating the natural language description 122 (e.g., "recounting") are described in the aforementioned priority patent application Ser. No. 13/737,607.

The NL generator module 118 may formulate the NL description 122 as natural language speech using, e.g., stored NL speech samples (which may be stored in, for example, data storage 620). The NL speech samples may include prepared NL descriptions of complex events and activities. Alternatively or in addition, the NL description 122 may be constructed "on the fly," using, e.g., a natural language generator and text-to-speech (TTS) subsystem, which may be implemented as part of the computing system 100 or as external modules or systems with which the computing system 100 is in communication over a computer network (e.g., a network 646).

The presentation templates 142 provide the specifications that the output generator module 114 uses to select salient event segments 112 for inclusion in the visual presentation 120, arrange the salient event segments 112, and create the visual presentation 120. For example, a presentation template 142 specifies, for a particular event type, the type of content to include in the visual presentation 120, the number of salient event segments 112, the order in which to arrange the segments 112, (e.g., chronological or by subject matter), the pace and transitions between the segments 112, the accompanying audio or text, and/or other aspects of the visual presentation 120. The presentation template 142 may further specify a maximum duration of the visual presentation 120, which may correspond to a maximum duration permitted by a video sharing service or a social media service (in consideration of the limitations of the computer network infrastructure or for other reasons). Portions of the templates 142 may be embodied as an ontology or knowledge base that incorporates or accesses previously developed knowledge, such as knowledge obtained from the analysis of many inputs 102 over time, and information drawn from other data sources that are publicly available (e.g., on the Internet). The output generator module 114 or more specifically, the visual presentation generator module 116, formulates the visual presentation 120 according to the system- or user-selected template 142 (e.g., by inserting the salient event segments 112 extracted from the multimedia input 102 into appropriate "slots" in the template 142).

The illustrative computing system 100 includes a number of semantic content learning modules 152, including feature learning modules 154, a concept learning module 156, a salient event learning module 158, and a template learning module 160. The learning modules 152 execute machine learning algorithms on samples of multimedia content (images and/or video) of an image/video collection 150 and create and/or update portions of the knowledge base 132 and/or the presentation templates 142. For example, the learning modules 152 may be used to initially populate and/or periodically update portions of the knowledge base 132 and/or the templates 142, 144. The feature learning modules 154 analyze sample images and videos from the collection 150 and populate or update the feature models 134. For example, the feature learning modules 154 may, over time or as a result of analyzing portions of the collection 150, algorithmically learn patterns of computer vision algorithm output that evidence a particular feature, and update the feature models 134 accordingly. Similarly, the concept learning module 156 may, over time or as a result of analyzing portions of the collection 150, algorithmically learn combinations of low level features that evidence particular concepts, and update the concept model 136 accordingly.

The illustrative salient event learning module 158 analyzes portions of the image/video collection 150 to determine salient event criteria 138, to identify events for inclusion in the mapping 140, to identify activities that are associated with events, and to determine the saliency of various activities with respect to different events. For example, the salient event learning module 158 may identify a new event or activity for inclusion in the mapping 140, or identify new salient event criteria 138, based on the frequency of occurrence of certain features and/or concepts in the collection 150. The salient event learning module 158 can also identify multi-modal salient event markers including "non visual" characteristics of input videos such as object motion, changes in motion patterns, changes in camera position or camera motion, amount or direction of camera motion, camera angle, audio features (e.g., cheering sounds or speech, including speech content, i.e., spoken words, as well as non-word features of a speech signal, such as prosodic features, as described in more detail below).

The illustrative template learning module 160 analyzes the collection 150 to create and/or update the presentation templates 142. For example, the template learning module 160 may, after reviewing a set of professionally made videos in the collection 150, incorporate organizational elements of those professionally made videos into one or more of the templates 142 or create a new template 142 that includes specifications gleaned from the professionally made videos. Portions of the template learning module 160 may algorithmically analyze the audio tracks of videos in the collection 150 and update the NL templates 144, as well.

The video collection 150 refers generally to one or more bodies of retrievable multimedia digital content that may be stored in computer memory at the computing system 100 and/or other computing systems or devices. The video collection 150 may include images and/or videos stored remotely at Internet sites such as YOUTUBE and INSTAGRAM, and/or images/videos that are stored in one or more local collections, such as storage media of a personal computer or mobile device (e.g., a "camera roll" of a mobile device camera application). In any case, images/videos in the collection 150 need not have been previously tagged with meta data or other identifying material in order to be useful to the computing system 100. The computing system 100 can operate on images/videos 150 and/or multimedia input 102 whether or not it has been previously tagged or annotated in any way. To the extent that any of the content in the collection 150 is already tagged with descriptions, any of the learning modules 152 can learn and apply those existing descriptions to the knowledge base 132 and/or the templates 142, 144.

The illustrative output generator module 114 interfaces with an interactive storyboard module 124 to allow the end user to modify the (machine-generated) visual presentation 120 and/or the (machine-generated) NL description 122, as desired. The illustrative interactive storyboard module 124 includes an editing module 126, a sharing module 128, and an auto-suggest module 162. The interactive storyboard module 124 and its submodules 126, 128, 162 are each embodied as software, firmware, hardware, or a combination thereof. The editing module 126 displays the elements of the visual presentation 120 on a display device (e.g., a display device 642, FIG. 6) and interactively modifies the visual presentation 120 in response to human-computer interaction (HCI) received by a human-computer interface device (e.g., a microphone 632, the display device 642, or another part of an HCI subsystem 638). The interactive storyboard module 124 presents the salient event segments 112 using a storyboard format that enables the user to intuitively review, rearrange, add and delete segments of the presentation 120 (e.g. by tapping on a touchscreen of the HCI subsystem 638). When the user's interaction with the presentation 120 is complete, the interactive storyboard module 124 stores the updated version of the presentation 120 in computer memory (e.g., a data storage 620).

The sharing module 128 is responsive to user interaction with the computing system 100 that indicates that the user would like to "share" the newly created or updated presentation 120 with other people, e.g., over a computer network, e-mail, a messaging service, or other electronic communication mechanism. The illustrative sharing module 128 can be pre-configured or user-configured to automatically enable sharing in response to the completion of a presentation 120, or to only share the presentation 120 in response to affirmative user approval of the presentation 120. In either case, the sharing module 128 is configured to automatically share (e.g., upload to an Internet-based photo or video sharing site or service) the presentation 120 in response to a single user interaction (e.g., "one click" sharing). To do this, the sharing module 128 interfaces with network interface technology of the computing system 100 (e.g., a communication subsystem 644).

The auto-suggest module 162 leverages the information produced by other modules of the computing system 100, including the event description 106, the NL description 122, and/or the visual presentation 120, to provide an intelligent automatic image/video suggestion service. In some embodiments, the auto-suggest module 162 associates, or interactively suggests, the visual presentation 120 or the multimedia input 102 to be associated, with other electronic content based on the event description 106 or the NL description 122 that the computing system 100 has automatically assigned to the multimedia input 102 or the visual presentation 120. To do this, the auto-suggest module 162 includes a persistent input monitoring mechanism that monitors user inputs received by the editing module 126 or other user interface modules of the computing system 100, including inputs received by other applications or services running on the computing system 100. The auto-suggest module 162 evaluates the user inputs over time, compares the user inputs to the event descriptions 106 and/or the NL descriptions 122 (using, e.g., a matching algorithm), determines if any user inputs match any of the event descriptions 106 or NL descriptions 122, and, if an input matches an event description 106 or an NL description 122, generates an image suggestion, which suggests the relevant images/videos 102, 120 in response to the user input based on the comparison of the description(s) 106, 122 to the user input. For example, if the auto-suggest module 162 detects a textual description input as a wall post to a social media page or a text message, the auto-suggest module 162 looks for images/videos in the collection 150 or stored in other locations, which depict visual content relevant to the content of the wall post or text message. If the auto-suggest module 162 determines that an image/video 102, 120 contains visual content that matches the content of the wall post or text message, the auto-suggest module 162 displays a thumbnail of the matching image/video as a suggested supplement or attachment to the wall post or text message.

In some embodiments, the auto-suggest module 162 operates in conjunction with other modules of the computing system 100 to interactively suggest an event description 106 or NL description 122 to associate with an image/video 102, 120. For example, if the system 100 determines that an unlabeled image/video 102, 120 has similar visual content to an already-labeled image/video in the collection 150, the system 100 may suggest that the event description 106 and/or the NL description 122 associated with the image in the collection 150 be automatically propagated to the unlabeled image/video 102, 120.

The illustrative computing system 100 also includes a user preference learning module 148. The user preference learning module 148 is embodied as software, firmware, hardware, or a combination thereof. The user preference learning module 148 monitors implicit and/or explicit user interactions with the presentation 120 (user feedback 146) and executes, e.g., machine learning algorithms to learn user-specific specifications and/or preferences as to, for example, the types of activities that the user considers to be "salient" with respect to particular events, the user's specifications or preferences as to the ordering of salient events in various types of different presentations 120, and/or other aspects of the creation of the presentation 120 and/or the NL description 122. The user preference learning module 148 updates the templates 142, 144 and/or portions of the knowledge base 132 (e.g., the salient event criteria 138) based on its analysis of the user feedback 146.

Figure 2:
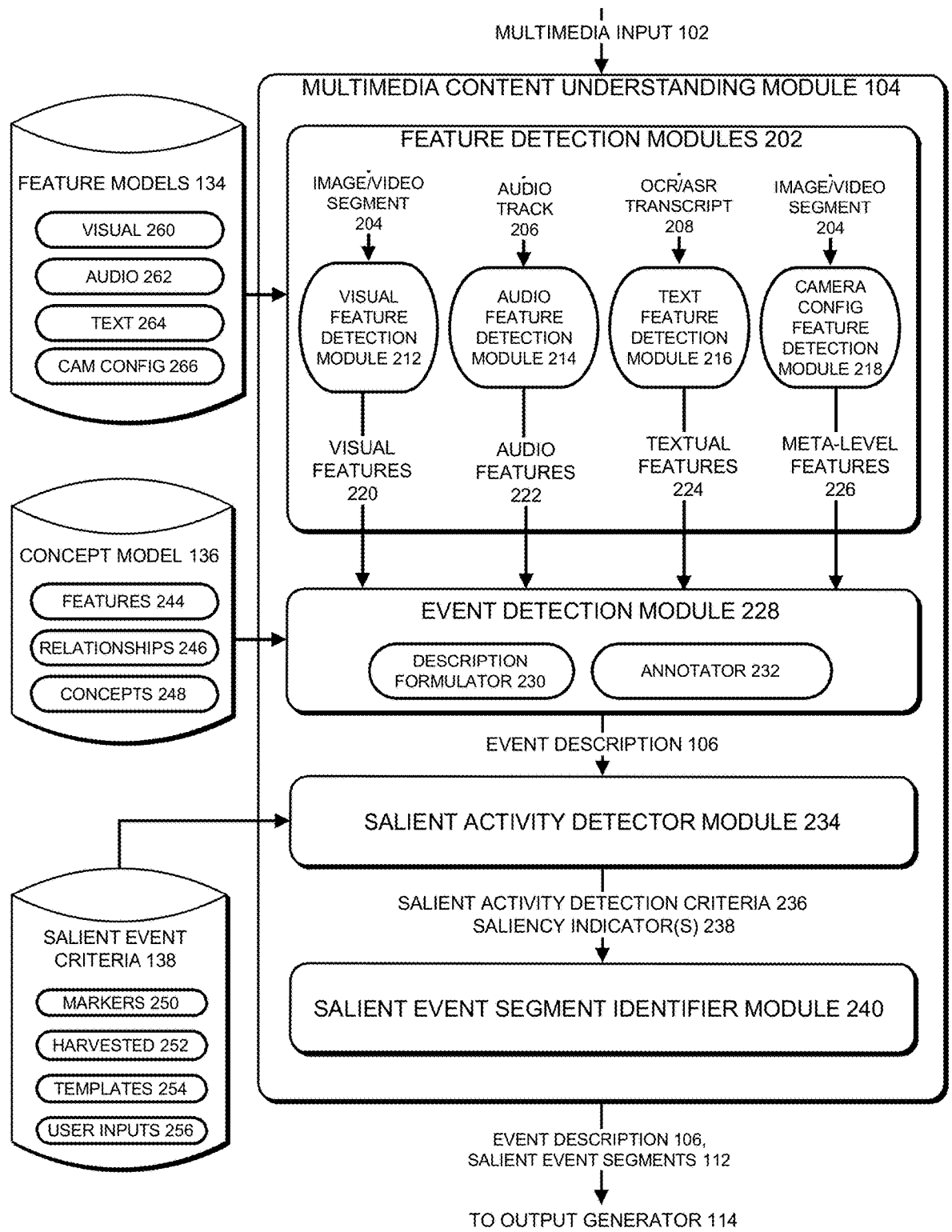
FIG. 2 is a simplified schematic diagram of an environment of at least one embodiment of the multimedia content understanding module of FIG. 1.

Referring now to FIG. 2, an embodiment of the multimedia content understanding module 104 is shown in greater detail, in the context of an environment that may be created during the operation of the computing system 100 (e.g., a physical and/or virtual execution or "runtime" environment). The multimedia content understanding module 104 and each of the components shown in FIG. 2 are embodied as machine-readable instructions, modules, data structures and/or other components, in software, firmware, hardware, or a combination thereof.

The illustrative multimedia content understanding module 104 includes a number of feature detection modules 202, including a visual feature detection module 212, an audio feature detection module 214, a text feature detection module 216, and a camera configuration feature detection module 218. The feature detection modules 202, including the modules 212, 214, 216, 218, are embodied as software, firmware, hardware, or a combination thereof. The various feature detection modules 212, 214, 216, 218 analyze different aspects of the multimedia input 102 using respective portions of the feature models 134. To enable this, the multimedia content understanding module 104 employs external devices, applications and services as needed in order to create, from the multimedia input 102, one or more image/video segments 204, an audio track 206, and a text/speech transcript 208.

The image/video segment(s) 204 each include one or more digital images of the multimedia input 102 (e.g., a still image, a set of still images, a video, or a set of videos). The visual feature detection module 212 analyzes each segment 204 using the visual feature models 236, and outputs a set of visual features 220 that have been detected in the segment 204. To do this, the visual feature detection module 212 employs a number of automated feature recognition algorithms 130 to detect lower-level features of interest in the input 102, and interfaces with the visual feature models 236 to recognize and semantically classify the detected features. As used herein, "low-level" may refer to, among other things, visual features that capture characteristic shapes and motion without significant spatio-temporal variations between different instances of the features. With regard to video input 102, both static and dynamic low-level visual features can be detected. Static visual features include features that are extracted from individual keyframes of a video at a defined extraction rate (e.g., 1 frame/second).

Some examples of static visual feature detectors include GIST, SIFT (Scale-Invariant Feature Transform), and colorSIFT. The GIST feature detector can be used to detect abstract scene and layout information, including perceptual dimensions such as naturalness, openness, roughness, etc. The SIFT feature detector can be used to detect the appearance of an image at particular interest points without regard to image scale, rotation, level of illumination, noise, and minor changes in viewpoint. The colorSIFT feature detector extends the SIFT feature detector to include color keypoints and color descriptors, such as intensity, shadow, and shading effects.

Dynamic visual features include features that are computed over x-y-t segments or windows of a video. Dynamic feature detectors can detect the appearance of actors, objects and scenes as well as their motion information. Some examples of dynamic feature detectors include MoSIFT, STIP (Spatio-Temporal Interest Point), DTF-HOG (Dense Trajectory based Histograms of Oriented Gradients), and DTF-MBH (Dense-Trajectory based Motion Boundary Histogram). The MoSIFT feature detector extends the SIFT feature detector to the time dimension and can collect both local appearance and local motion information, and identify interest points in the video that contain at least a minimal amount of movement. The STIP feature detector computes a spatio-temporal second-moment matrix at each video point using independent spatial and temporal scale values, a separable Gaussian smoothing function, and space-time gradients. The DTF-HoG feature detector tracks two-dimensional interest points over time rather than three-dimensional interest points in the x-y-t domain, by sampling and tracking feature points on a dense grid and extracting the dense trajectories. The HoGs are computed along the dense trajectories to eliminate the effects of camera motion (which may be particularly important in the context of unconstrained or "in the wild" videos). The DTF-MBH feature detector applies the MBH descriptors to the dense trajectories to capture object motion information. The MBH descriptors represent the gradient of optical flow rather than the optical flow itself. Thus, the MBH descriptors can suppress the effects of camera motion, as well. However, HoF (histograms of optical flow) may be used, alternatively or in addition, in some embodiments. Additional details of the illustrative low-level feature detectors can be found in the priority application, U.S. Provisional Patent Application Ser. No. 61/637,196.

The illustrative visual feature detection module 212 quantizes the extracted low-level features by feature type using the visual feature models 236. In some embodiments, the feature models 236 or portions thereof are machine-learned (e.g., from training data in the collection 150) using, e.g., k-means clustering techniques. The visual feature detection module 212 can aggregate the quantized low-level features by feature type, by using, for example, a Bag-of-Words (BoW) model in which a frequency histogram of visual words is computed over the entire length of a video. The visual feature detection module 212 identifies the visual features 220 to the event detection module 228.

Some embodiments of the computing system 100 can detect the presence of a variety of different types of multimedia features in the multimedia input 102, including audio and text, in addition to the more typical visual features (e.g., actors, objects, scenes, actions). Any or all of these features may be detected using detectors that are trained via machine-learning techniques. The illustrative audio feature detection module 214 analyzes the audio track of an input 102 using mathematical sound processing algorithms and uses the audio feature model 262 (e.g., an acoustic model) to detect and classify audio features 222. For example, the audio feature detection module 214 may detect an acoustic characteristic of the audio track of a certain segment of an input video 102, and, with the audio feature model 262 (which may be trained using machine learning techniques), classify the acoustic characteristic as indicating a "cheering" sound or "applause." Some examples of low level audio features that can be used to mathematically detect audio events in the input 102 include Mel frequency cepstral coefficients (MFCCs), spectral centroid (SC), spectral roll off (SRO), time domain zero crossing (TDZC), and spectral flux.

In some embodiments, the audio feature detection module 214 extracts speech features, such as prosodic features, from the audio signal. Prosodic features include loudness, pitch, pitch contour, and speaking rate. Prosodic features can be used to analyze the emotional or affective content of a speech signal. Some techniques for extracting prosodic features from an audio signal are described in Shriberg et al., U.S. Pat. No. 7,177,810, of SRI International. Other techniques involve extracting frame-wise low-level descriptors (LLDs) from the audio signal and then using functional features to aggregate these features over the utterance level. Audio feature extraction may be performed using, e.g., the OpenSMILE toolkit. In some implementations, the system 100 also or alternatively extracts acoustic unit descriptors (ADDs), which model distributions of short audio sequences and can thereby capture local temporal variations in the audio signal. Thus, in some cases, the system 100 can extract speech features over a time interval and detect changes in the speech features over time (e.g., rising or falling pitch, speaking rate, etc.). Additional analytical techniques may be applied to the longitudinal data to assess, for example, whether a person's level of excitement or agitation seems to be increasing or decreasing. Some embodiments of the system 100 can use these cues (e.g., indicators of increasing or decreasing arousal) to predict start and endpoints of a salient event.

In some embodiments, the extracted audio features may individually or collectively be used to detect audio concepts and/or to identify individual speakers or speaker-specific characteristics, including different emotions, affect, or different states of arousal or agitation, or changes in emotion/affect/arousal state over time. To do this, a bag-of-words representation may be used. For instance, hierarchical K-means clustering can be used to build vocabularies from the extracted audio features. Separate vocabularies may be constructed for energy-normalized and un-normalized features. Normalized features can capture pitch-based characteristics of the speech signal while un-normalized features can encode loudness-based characteristics. Using these vocabularies, the extracted features can be quantized to obtain a histogram representation corresponding to each feature type. The extracted audio features can also be used to identify segments of the video that likely contain salient visual features. For example, detection of a pause may indicate that a salient event is likely to begin shortly after the pause; detection of cheering may indicate that the salient event is nearing conclusion.

The audio feature model 262 is manually authored and/or developed using machine learning algorithms to process training data from which audio features have been extracted as described above. The audio feature model 262 is used along with machine learning algorithms (e.g., a support vector machine or SVM classifier) to classify segments of the audio track according to pre-defined semantic categories as described in more detail below. The audio feature detection module 214 identifies the detected audio features 222 (individually or in combination) to the event detection module 228.

The text feature detection module 216 interfaces with an automated speech recognition (ASR) system and/or a video optical character recognition (OCR) system. The ASR and/or OCR system may be a part of the computing system 100 or in communication with the computing system 100 via a computer network (e.g., a network 646). An ASR system may identify spoken words present in the audio track of a video input 102 and provide a text translation of the spoken words (e.g., a transcript 208) to the text feature detection module 216. An OCR system may recognize text that is present in a visual scene of an image or video, and provide the recognized text (e.g., a transcript 208) to the text feature detection module 216. For example, the OCR system may be used to detect words or phrases displayed on apparel, street signs, or buildings that are depicted in one or more scenes of the input images/video 102. The text feature detection module 216 evaluates the transcript 208 using a text model 264 to extract portions of the transcript 208 that may be semantically meaningful. Portions of the text model 264 may be embodied as a language model or vocabulary, for example. The illustrative text model 264 is manually authored and/or developed using training data and machine learning techniques, in a similar fashion to the visual feature models 236 except that the text features of the training data are analyzed rather than the visual features, in order to develop the text model 264. As an example of the use of the text feature detection module 216, an ASR transcript 208 of a video input 102 may include the words, "he just scored" and/or an OCR transcript 208 of the video input 102 may include the phrase "GO NINERS." The text feature detection module 216 identifies these textual features 224 to the event detection module 228.

The camera configuration feature detection module 218 detects "meta-level" features 226 in images and video input 102. Some examples of meta-level features 226 include camera motion, camera view angle, number of shots taken, shot composition, and shot duration (e.g., number of frames in a video input 102). The computing system 100 uses one or more of the meta-level features 226 to discern the intent of the person taking the picture or video: what were they trying to capture? The camera angle, the direction and speed of the motion of the camera relative to a detected event in a video input 102 (e.g., tracking) can reveal people or objects of interest to the camera holder. For example, the camera configuration feature detection module 218 may determine, based on information in the camera configuration model 266, that if a set of meta-level features 226 indicates that the camera is tracking the movement of a particular person or object in the scene at a particular speed, the tracked person or object is likely to be of interest to the camera holder, and thus, salient event segments 112 should include the tracked person or object. The illustrative camera configuration feature model 266 is manually authored and/or developed using training data and machine learning techniques, in a similar fashion to the visual feature models 260 except that the meta-level features of the training data are analyzed rather than the visual features, in order to develop the camera configuration feature model 266. The camera configuration feature module 266 identifies the meta-level features 226 to the event detection module 228.

Referring now to the event detection module 228, the illustrative event detection module 228 uses data fusion techniques to combine the visual features 220, the audio features 222, the textual features 224, and the meta-level features 226, to the extent that each or any of these types of features are detected in the multimedia input 102. In this way, the event detection module 228 can utilize a variety of visual and non-visual features to identify events and salient activities in the input 102.

The illustrative event detection module 228 applies a supervised machine learning model, such as Support Vector Machine (SVM) classifiers, to the visual features 220 (e.g., BoW features). The event detection module 228 uses data fusion strategies (e.g., early and late fusion) to identify events in the input 102, based on the fused low-level features 220, 222, 224, 226. In other embodiments, the event detection module 228 performs concept detection based on the low-level features 220 (and/or the low-level features 222, 224, 226) and determines the events based on the detected concepts, using the concept model 136. For example, the event detection module 228 may use one or more concept classifiers to analyze the low-level features 220, 222, 224, 226 and use the concept model 136 to classify the low-level features 220, 222, 224, 226 as representative of certain higher-level concepts, including vision-based concepts such as scenes, actions, actors, and objects, as well as audio-based concepts such as cheering, excitement, agitation, calmness and speaker identity. As such, the illustrative concept model 136 includes data 244 (e.g., semantic elements) identifying low level features 220, 222, 224, 226, data 248 (e.g., semantic elements) identifying semantic concepts, and data 246 (e.g., semantic elements) identifying relationships between the various low level features 220, 222, 224, 226 and the concepts 248 and/or relationships between different concepts 248. The event detection module 228 may apply one or more event classifiers to the features 244, relationships 246, and/or concepts 238 to determine whether a combination of features 244, relationships 246, and/or concepts 238 evidences an event. The relationships 246 may include, for example, temporal relations between actions, objects, and/or audio events (e.g., "is followed by"), compositional relationships (e.g., Person X is doing Y with object Z), interaction relationships (e.g., person X is pushing an object Y or Person Y is using an object Z), state relations involving people or objects (e.g., "is performing," "is saying"), co-occurrence relations (e.g., "is wearing," "is carrying"), spatial relations (e.g., "is the same object as"), temporal relations between objects (e.g., "is the same object as"), and/or other types of attributed relationships (e.g., spatial, causal, procedural, etc.). The relationships 246 may specify a variety of different types of relationships between low level features 220, 222, 224, 226 and concepts 248, and/or between different types of concepts 248. Maintaining the data relating to features 244, relationships 246, and concepts 248 allows the system 100 to detect higher level semantic concepts that tend to evidence events, including complex events. Some additional examples of such higher level concepts include "crowd dancing," "person giving speech," "people drinking," and "person running." It should be noted that the relationships 246 include not only relationships between different visual features, but also relationships between different types of multimedia features and concepts; for instance, relationships between audio features 222 and visual features 220 (e.g., a loud voice is followed by a person kicking or punching) or relationships between text features and sound features (e.g., a GO NINERS sign and cheering).

Each or any of the models 134, 136 and/or the mapping 140 can maintain (e.g., probabilistic or statistical) indicators of the determined evidentiary significance of the relationships between features, concepts, events, and salient activities. In some embodiments, indicators of evidentiary significance are determined using machine learning techniques. For example, a machine learning analysis of training videos depicting a "person making a sandwich" (a complex event) may indicate that semantic descriptions such as "kitchen" (scene), "hands visible" (actor), "placing fillings on bread" (action) and "spreading creamy substance" (action) are highly likely to be associated with a person making a sandwich, while other semantic descriptions such as "outdoor event," (scene), "vehicle moving" (action) or "person jumping" (action) are unlikely to be associated with that particular event. Such indicators can be used by the multimedia content understanding module 104, or the event detection module 228 more specifically, to perform semantic reasoning.

The event detection module 106 may apply a single description 106 (e.g., concept label) to an entire input 102 (e.g., video) or may segment the video temporally and assign separate audio, visual, text, etc. concept labels to each temporal segment of the video. For example, the video may be segmented into temporally homogeneous segments, and then concept labels are assigned to each segment. The video can be segmented based on its audio content using, e.g., Simple Linear Iterative Clustering (SLIC) or similar techniques. Separate audio, visual, text, etc. concept labels can be assigned to the input 102 or its segments, or concept labels that describe combinations of audio, visual, and/or text, etc. concepts can be used.

The event detection module 228 includes a description formulator 230 and an annotator 232. The event detection module and each of its submodules 230, 232 is embodied as software, firmware, hardware, or a combination thereof. Once the event detection module 228 has determined (e.g., through semantic reasoning) an event associated with the input 102, the description formulator 230 generates the event description 106 as described above, and the annotator 232 annotates or otherwise associates the event description 106 with the multimedia input 102 (e.g., by appending a meta tag to the input 102 or by other suitable techniques).

The event detection module 228 identifies the event description 106 to the salient activity detector module 234. The salient activity detector module 234 uses the salient event criteria 138 to evaluate the event description 106 and/or the detected features 220, 222, 224, 226 of the multimedia input 102 to determine the salient activities associated with the event description 106 or with the multimedia input 102 more generally. To do this, the salient activity detector module 234 maps the event description 106 to salient activities using, e.g., the mapping 140 and/or knowledge contained in the salient event criteria 138. The salient event criteria 138 can be derived from a number of different sources. For example, salient event markers 250 can be determined by applying machine learning techniques to training samples (e.g., portions of the image/video collection 150) of meta-level features 226. In other words, the computing system 100 can learn, over time, characteristic data values of meta-level features 226 or combinations of meta-level features that tend to be representative of salient events. The illustrative salient event criteria 138 also includes harvested salient event criteria 252. The harvested salient event criteria 252 is derived by analyzing samples of training data (e.g., portions of the image/video collection 150) to determine, for example, the activities that appear most often in videos depicting certain types of events. Activities that frequently appear in videos may be considered salient activities according to the computing system 100. The salient event criteria 138 also includes salient activity templates 254. The templates 254 may include portions of the presentation templates 142. For example, a presentation template 142 may specify a list of activities that are considered to be "salient" for a particular type of video montage or other visual presentation 120. The salient event criteria 138 may also include salient event criteria that is specified by or derived from user inputs 256. For example, the interactive storyboard module 124 may determine salient event criteria based on user inputs received by the editing module 126. As another example, the user preference learning module 148 may derive new or updated salient event criteria based on its analysis of the user feedback 146.

The salient event criteria 138 identifies the salient activities associated with the event description 106. The salient event criteria 138 also specifies the information that the computing system 100 needs to detect those salient activities in the input 102 using the feature detection algorithms 130, e.g., salient event detection criteria. For example, the salient event detection criteria may include data values and/or algorithm parameters that indicate a particular combination of features 220, 222, 224, 226 that is associated with a salient activity. Each or any of the salient event criteria 138 may have associated therewith one or more saliency indicators 238. The saliency indicators 238 can be used by the computing system 100 to select or prioritize the salient event segments 112. The saliency indicators 238 may be embodied as attributes of the markers 250, the harvested criteria 252, the templates 254 and/or the user inputs 256. For instance, each salient event criterion may have an associated saliency indicator 238. Further, a salient event criterion may have multiple saliency indicators 238, as the criterion may have different degrees of saliency in relation to different events.

The salient activity detector module 234 identifies the salient activity detection criteria 236 (e.g., the instructions or data for algorithmically detecting the salient activities in the input 102) and the saliency indicator(s) 238 to the salient event segment identifier module 240. The salient event identifier module 240 uses the saliency indicator(s) 238 and/or the salient activity detection criteria 236 to select the appropriate feature detection algorithms 130 to execute on the input 102, in order to algorithmically identify the salient event segments 112, executes the selected algorithms 130, and provides data indicating the identified salient event segments 112 and the event description 106 to the output generator module 114.

Figure 3:
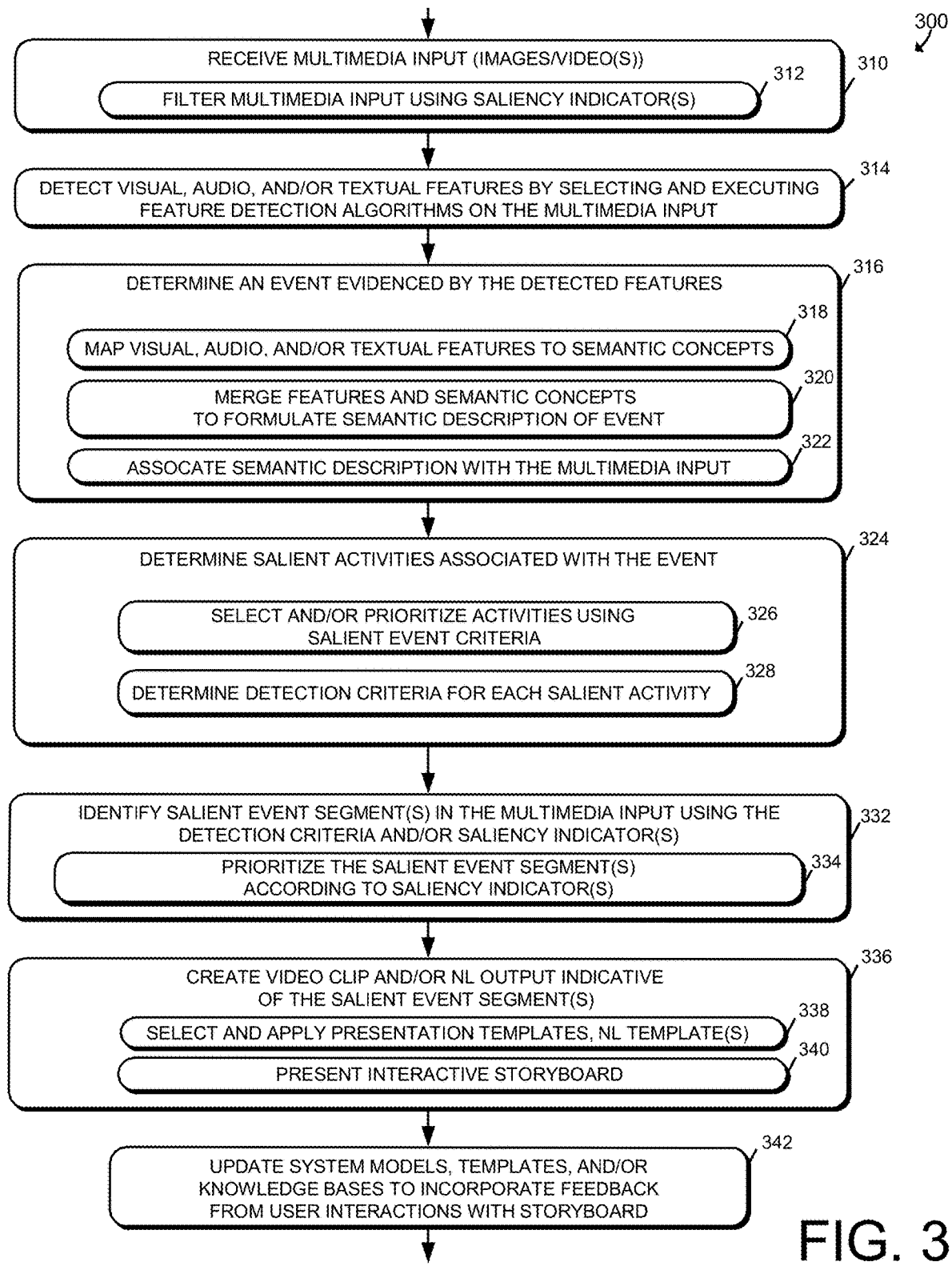
FIG. 3 is a simplified flow diagram of at least one embodiment of a process executable by the computing system of FIG. 1 to provide multimedia content understanding and assistance as disclosed herein.

Referring now to FIG. 3, an example of a process 300 executable by the computing system 100 to provide multimodal video content understanding and assistance services is shown. The process 300 may be embodied as computerized programs, routines, logic and/or instructions executed by the computing system 100, for example by one or more of the modules and other components shown in FIGS. 1 and 2, described above. At block 310, the system 100 receives one or more input files, e.g. a multimedia input 102. The input file(s) can be embodied as, for example, raw video footage or digital pictures captured by smartphone or other personal electronics device. The input file(s) may be stored on a local computing device and/or a remote computing device (e.g., in personal cloud, such as through a document storing application like DROPBOX. Thus, the input file(s) may be received by a file uploading, file transfer, or messaging capability of the end user's computing device and/or the computing system 100 (e.g., the communication subsystems 644, 672). At block 312, the computing system 100 may perform a preliminary step of filtering the input file(s) based on one or more of the saliency indicators. For example, the computing system 100 may evaluate the meta level features 226 of the input as a preliminary step and filter out any files or video frames that fall outside the scope of the saliency indicators for the meta level features 238. This pre-processing step may, for example, help eliminate low quality footage prior to execution of other feature detection algorithms 130.

At block 314, the computing system 100 executes the feature detection algorithms 130 on the input remaining after the pre-processing (if any) of block 312. The feature detection algorithms 130 detect visual features 220, audio features 222, and/or textual features 224 as described above. The algorithms may also detect meta level features 226, if not already performed at block 312. At block 316, the system 100 evaluates the detected features 220, 222, 224, and/or 226 and based on that evaluation, determines an event that is evidenced by the detected features. To do this, the system 100 maps the visual, audio, and/or textual features 220, 222, 224 to semantic concepts (using e.g., the concept model 136 and/or the mapping 140) at block 318. The system 320 merges the features 220, 222, 224 and semantic concepts at block 320 (using, e.g., the mapping 140) to formulate a semantic description of the event that the system 100 has determined is evidenced by the detected features. The semantic description may be embodied as the event description 106 as described above. At block 322, the system 100 associates the semantic description of the event with the input file(s) (using, e.g., meta tags). Thus, as a result of block 316, the system 100 automatically classifies the input file(s) as depicting an event based on the output of the feature detection algorithms 130.

In other embodiments, at block 316, the system 100 classifies the input without executing the feature detection algorithms 130. For example, the system 100 may receive the event type (e.g., an event description 106) from an end user, e.g., as a text string, search query, or meta tag. The system 100 may extract meta tags previously associated with the input and use those meta tags to classify the input. Thus, in some embodiments, feature detection algorithms may be used to determine the salient event segments as described herein, but not to determine the initial event classification.

At block 324, the computing system 100 determines the salient activities that are associated with the event determined at block 316. To do this, the system 100 uses the salient event criteria 138 and/or the mapping 140 to evaluate the event information generated at block 316. For example, the system 100 determines, using the mapping 140, activities that are associated with the detected event. The system 100 may also use the saliency indicators 238 at block 326 to prioritize the salient activities so that, for example, if a template 142 specifies a limitation on the length or duration of the visual presentation 120, segments of the input that depict the higher priority salient activities can be included in the presentation 120 and segments that depict lower priority activities may be excluded from the presentation 120. At block 328, the system 100 determines the salient activity detection criteria for each of the salient activities identified by the salient event criteria. As discussed above, the salient activity detection criteria are used by the system 100 to algorithmically identify the salient event segments 112 of the input file(s). For example, the system 100 may utilize the salient activity detection criteria as input or parameters of one or more of the feature detection algorithms 130.

At block 332, the system 100 identifies the salient event segments 112 in the multimedia input file(s). To do this, the system 100 executes one or more of the feature detection algorithms 130 using the salient activity detection criteria determined at block 328. The system 100 also uses the saliency indicators 238, if any, to filter or prioritize the salient event segments 112 (block 334). At block 336, the computing system 100 generates the visual presentation 120 (e.g., a video clip or "montage"), and/or the NL description 122, using, e.g., the templates 142, 144 as described above (block 338). At block 340, the system 100 presents the visual presentation 120 and/or the NL description 122 to the end user using an interactive storyboard type of user interface mechanism. The interactive storyboard mechanism allows the user to review, edit, approve, and share the visual presentation 120 and/or the NL description 122. At block 342, the computing system 100 incorporates feedback learned or observed through the user's interactions with the interactive storyboard into one or more of the system models, templates, and/or knowledge bases. As mentioned above, the templates 142, 144, the salient event criteria 138 (including saliency indicators 238), and/or other portions of the knowledge base 132 may be updated in response to the user's interactions (e.g., editing, viewing, sharing) with the visual presentation 120 and/or the NL description 122 via the interactive storyboard mechanism. It should be noted that while this disclosure refers to a "storyboard" type mechanism, other types and formats of intuitive human computer interfaces or other mechanisms for the review and editing of multimedia files may be used equally as well.

Figure 4:
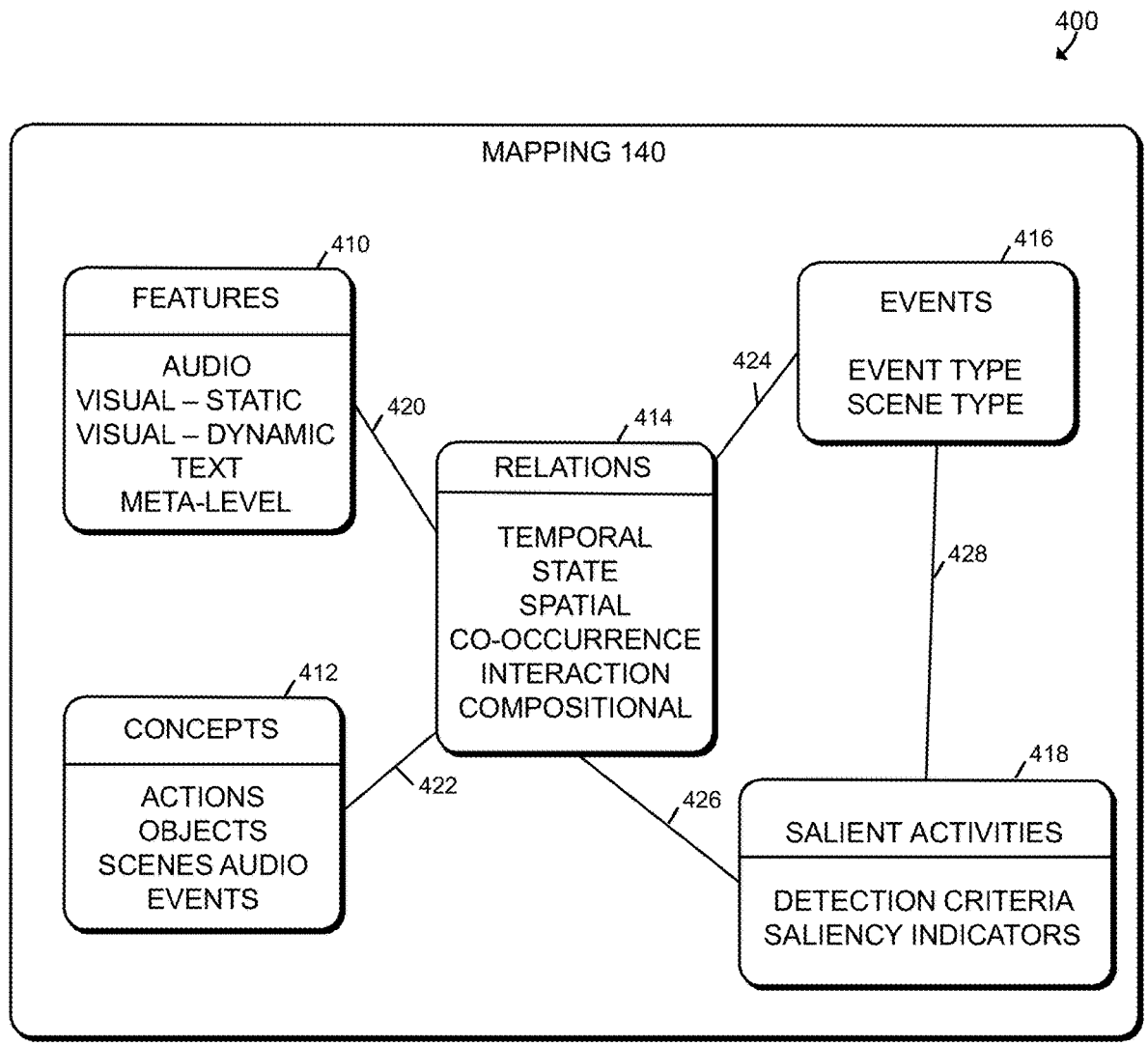
FIG. 4 is a simplified schematic illustration of at least one embodiment of feature, concept, event, and salient activity modeling as disclosed herein.

Referring now to FIG. 4, an embodiment of the mapping 140 is shown in greater detail. The illustrative mapping 140 and portions thereof may be embodied as one or more data structures, such as a searchable database, table, or knowledge base, in software, firmware, hardware, or a combination thereof. The mapping 140 establishes relationships between and/or among semantic elements of the various stored models described above (e.g., the feature models 134 and the concept model 136). As shown in FIG. 4, the illustrative mapping 140 defines logical links or connections 420, 422, 424, 426, 428 between the various types of detected features 410, concepts 412, relations 414, events 416, and salient activities 418. The system 140 can use the mapping 140 and particularly the links 420, 422, 424, 426, 428, in performing the semantic reasoning to determine events and salient activities based on the features 410, concepts 412, and relations 414. The mapping 140 may be embodied as, for example, an ontology that defines the various relationships between the semantic elements shown in FIG. 4. The mapping 140 may be initially developed through a manual authoring process and/or by executing machine learning algorithms on sets of training data. The mapping 140 may be updated in response to use of the system 100 over time using, e.g., one or more machine learning techniques. The mapping 140 may be stored in computer memory, e.g., as part of the stored models, knowledge base, and/or templates 626, 666.

Example Usage Scenarios

Figure 5:
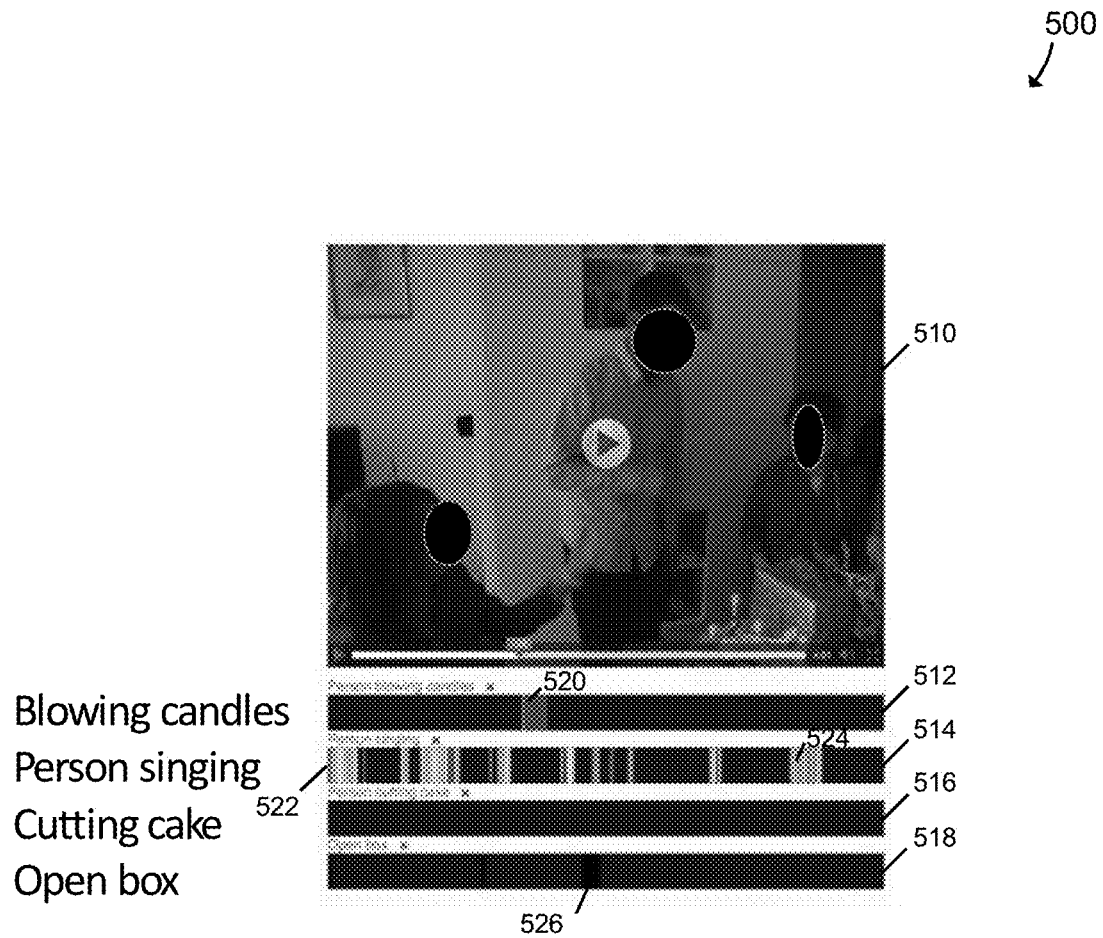
FIG. 5 is a simplified example of at least one embodiment of automated salient event detection in a video as disclosed herein.

Referring now to FIG. 5, an example 500 of salient event segment identification as disclosed herein is shown (faces intentionally occluded). Video 510 is an input to the system 100. The system 100 analyzes the video using feature detection algorithms and semantic reasoning as described above. Time-dependent output of the system 100's semantic analysis of the detected features is shown by the graphics 512, 514, 516, 518. In the graphic 512, the portion 520 represents a salient event segment 112 of the video 510. The system 100 has determined, using the techniques described above, that the salient event segment 520 depicts the salient activity of blowing out candles. Similarly, the system 100 has identified, using the techniques described above, salient event segments 522, 524, each of which depicts a person singing, and a salient event segment 526, which depicts a person opening a box. The system 100 did not detect any segments depicting the activity of cutting a cake, in the video 510. The system 100 can extract the segments 520, 522, 524, 526 from the video 510 and incorporate the segments 520, 522 524, 526 into a video clip that includes only the most interesting or salient portions of the video 510.

One usage scenario of the technology disclosed herein provides a fully-automated video creation service with a "one-click" sharing capability. In this embodiment, the service takes one or more input video files, which can be e.g. raw footage captured by smartphone, and identifies a most-relevant event type for the uploaded video, e.g. birthday party, wedding, football game. The service identifies the event using feature recognition algorithms, such as described above and in the aforementioned priority patent applications of SRI International. In some instances, the step of event identification can be done manually, such as by the user selecting an event type from a menu or by typing in keywords. In this embodiment, the event type corresponds to a stored template identifying the key activities typically associated with that event type. For example, for a birthday party, associated activities would include blowing out candles, singing the Happy Birthday song, opening gifts, posing for pictures, etc. Using feature detection algorithms for complex activity recognition, such as those described above and in the aforementioned priority patent applications, the service automatically identifies segments (sequences of frames) within the uploaded file that depict the various key activities or moments associated with the relevant event type. The service automatically creates a highlight clip by splicing together the automatically-identified segments. The user can review the clip and instruct the service to save the clip, download it, and/or post/share it on a desired social network or other site.

In another usage scenario, a video creation service provides interactive storyboard editing capabilities. In this embodiment, the process begins with one or more user-designated input video files. As above, an event type is identified, and video segments depicting key activities/moments are algorithmically identified. In this embodiment, the system may identify more salient event segments than it actually proposes to use in a highlight clip, e.g., due to limits on total clip length, uncertainty about which segments are best, redundant capture of the same event/activities by multiple video sources, or other factors. Then, the service displays to the user an interactive storyboard, with thumbnails or other icons representing each of the segments along a timeline, and a visual indication of the segments that the system tentatively proposes to use in the highlight clip. If there is video from multiple sources for the same activities, then multiple corresponding rows of segments can be displayed, with visual indication of which segments from each row are to be used in the edited clip. An example situation in which this may occur is a child's birthday party, where both parents and other relatives (e.g., grandparents) may be taking video of the child's party. In this case, the system 100 can select salient event segments from the different videos in the group of videos taken by the family members and merge them into a highlight clip. In this embodiment, the user can modify the content of the highlight clip interactively by selecting different segments to use, with the interactive storyboard interface. In some embodiments, the user can also change the beginning and/or ending frames of a segment by selecting the segment for editing, previewing it along with neighboring frames from the original footage, and using interactive controls to mark desired start and end frames for the system. Once the user review/editing is complete, the service constructs a highlight clip by splicing segments together in accordance with the user's edits. As above, the user can preview the clip and decide to save or share the clip, for example.

Other embodiments include additional features, alternatively or in addition to those described above. As illustrated in the above example, the system 100 can handle multiple input files at one time, even if the input files are from multiple different users/devices. In some embodiments, the automated creation of the highlight clip can be performed by the system 100 in real time, on live video (e.g., immediately after a user has finished filming, the system 100 can initiate the highlight creation processes). In the interactive embodiments, users can add transition effects between segments, where the transition effects may be automatically selected by the service and/or chosen by the user.

In some embodiments, the event description 106 or the NL description 122 generated automatically by the system 100 can take the form of, e.g., meta data that can be used for indexing, search and retrieval, and/or for advertising (e.g., as ad words). The meta data can include keywords that are derived from the algorithmically performed complex activity recognition and other semantic video analysis (e.g. face, location, object recognition; text OCR; voice recognition), performed by the system 100 using the feature detection algorithms 130 as described above. The meta data can be used by query expansion and/or query augmentation mechanisms to facilitate keyword searching, clustering, or browsing of a collection 150. Alternatively or in addition, the meta data can be used for automatic image/video suggestion in response to user input or in relation to other electronic content (e.g., text or images posted on an Internet web site) (e.g., by the auto-suggest module 162). For example, if a user begins typing text in an email, text message, or social media post, the system 100 can use the meta data to automatically, based on the text input (which may be only partially complete), generate a list of relevant images and/or videos, which the user may want to attach to the message or share along with the post.

In some embodiments, the content processing, e.g., the complex event recognition, is done on a server computer (e.g., by a proprietary video creation service), so captured video files are uploaded by the customer to the server, e.g. using a client application running on a personal electronic device or through interactive website. Interactive aspects, such as storyboard selection and editing of clip segments, may be carried out via online interaction between the customer's capture device (e.g., camera, smartphone, etc.), or other customer local device (e.g. tablet, laptop), and the video service server computer. Responsive to local commands entered on the customer's device, the server can assemble clip segments as desired, and redefine beginning and end frames of segments, with respect to the uploaded video content. Results can be streamed to the customer's device for interactive viewing. Alternatively or in addition, computer vision algorithms (such as complex event recognition algorithms) may be implemented locally on the user's capture device and the video creation service can be delivered as an executable application running on the customer's device.

Implementation Examples

Figure 6:
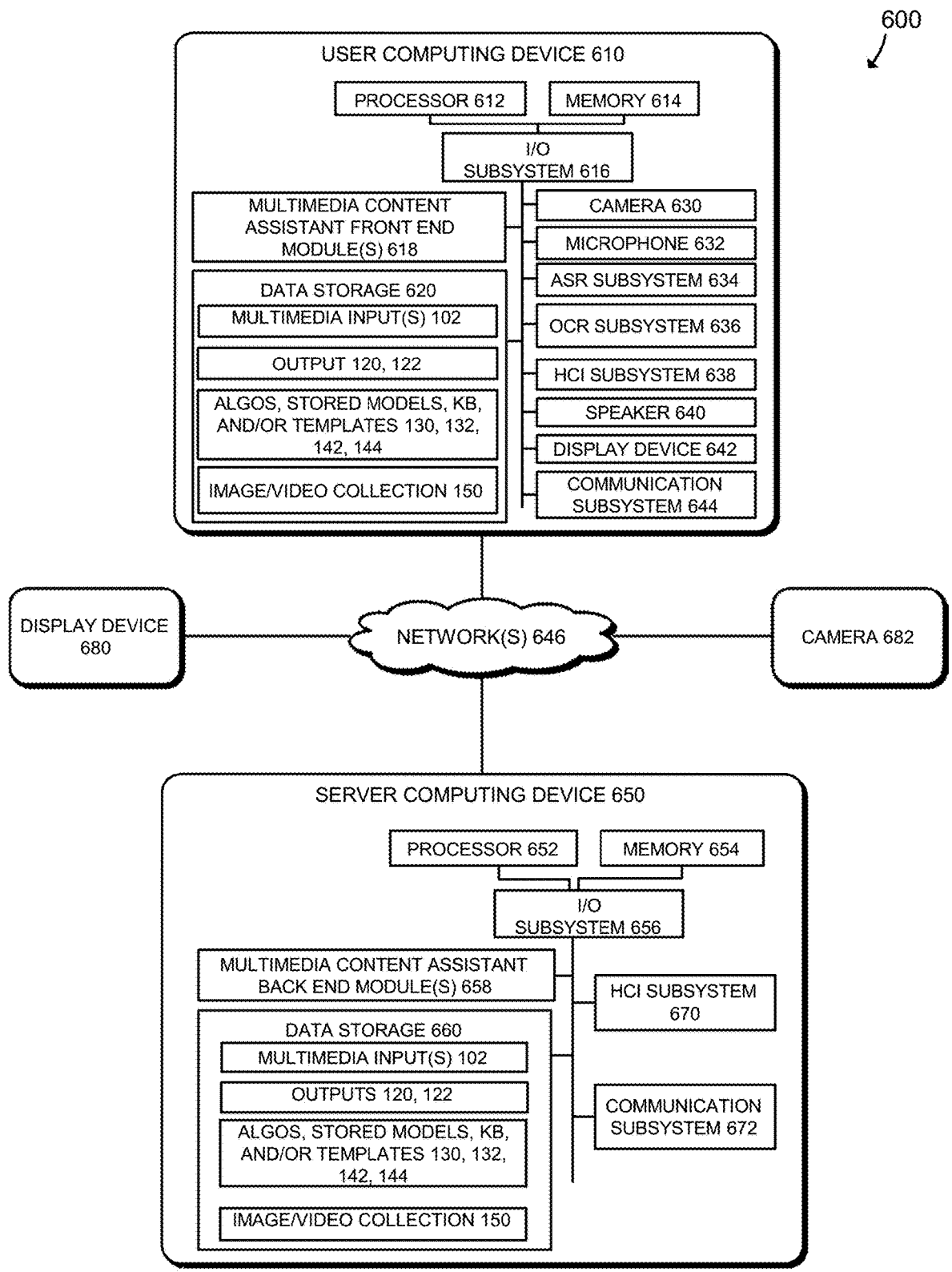
FIG. 6 is a simplified block diagram of an exemplary computing environment in connection with which at least one embodiment of the system of FIG. 1 may be implemented.

Referring now to FIG. 6, a simplified block diagram of an embodiment 600 of the multimedia content understanding and assistance computing system 100 is shown. While the illustrative embodiment 600 is shown as involving multiple components and devices, it should be understood that the computing system 100 may constitute a single computing device, alone or in combination with other devices. The embodiment 600 includes a user computing device 610, which embodies features and functionality of a "client-side" or "front end" portion 618 of the computing system 100 depicted in FIG. 1, and a server computing device 650, which embodies features and functionality of a "server-side" or "back end" portion 658 of the system 100. The embodiment 600 includes a display device 680 and a camera 682, each of which may be used alternatively or in addition to the camera 630 and display device 642 of the user computing device 610. Each or any of the computing devices 610, 650, 680, 682 may be in communication with one another via one or more networks 646.

The computing system 100 or portions thereof may be distributed across multiple computing devices that are connected to the network(s) 646 as shown. In other embodiments, however, the computing system 100 may be located entirely on, for example, the computing device 610 or one of the devices 650, 680, 682. In some embodiments, portions of the system 100 may be incorporated into other systems or computer applications. Such applications or systems may include, for example, commercial off the shelf (COTS) or custom-developed virtual personal assistant applications, video montage creation applications, content sharing services such as YOUTUBE and INSTAGRAM, and social media services such as FACEBOOK and TWITTER. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The illustrative user computing device 610 includes at least one processor 612 (e.g. a microprocessor, microcontroller, digital signal processor, etc.), memory 614, and an input/output (I/O) subsystem 616. The computing device 610 may be embodied as any type of computing device capable of performing the functions described herein, such as a personal computer (e.g., desktop, laptop, tablet, smart phone, body-mounted device, wearable device, etc.), a server, an enterprise computer system, a network of computers, a combination of computers and other electronic devices, or other electronic devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of hardware and/or software components, including the components of the computing system shown in FIGS. 1 and 2 or portions thereof (e.g., the multimedia content assistant front end modules 618), the camera 630, and the display device 642. As used herein, a "camera" may refer to any device that is capable of acquiring and recording two-dimensional (2D) or three-dimensional (3D) video images of portions of the real-world environment, and may include cameras with one or more fixed camera parameters and/or cameras having one or more variable parameters, fixed-location cameras (such as "stand-off" cameras that are installed in walls or ceilings), and/or mobile cameras (such as cameras that are integrated with consumer electronic devices, such as laptop computers, smart phones, tablet computers, wearable electronic devices and/or others.

The camera 630, a microphone 632, speaker(s) 640, and the display device 642 may form part of a human-computer interface subsystem 638, which includes one or more user input devices (e.g., a touchscreen, keyboard, virtual keypad, microphone, etc.) and one or more output devices (e.g., speakers, displays, LEDs, etc.). The human-computer interface device(s) 638 may include, for example, a touchscreen display, a touch-sensitive keypad, a kinetic sensor and/or other gesture-detecting device, an eye-tracking sensor, and/or other devices that are capable of detecting human interactions with a computing device.

The devices 630, 640, 642, 680, 682 are illustrated in FIG. 6 as being in communication with the user computing device 610, either by the I/O subsystem 616 or a network 646. It should be understood that any or all of the devices 630, 640, 642, 680, 682 may be integrated with the computing device 610 or embodied as a separate component. For example, the camera 630 and/or microphone 632 may be embodied in a wearable device, such as a head-mounted display, GOOGLE GLASS-type device or BLUETOOTH earpiece, which then communicates wirelessly with the computing device 610. Alternatively, the devices 630, 640, 642, 680, 682 may be embodied in a single computing device, such as a smartphone or tablet computing device.

The I/O subsystem 616 is also communicatively coupled to one or more storage media 620, an ASR subsystem 634, an OCR subsystem 636, and a communication subsystem 644. It should be understood that each of the foregoing components and/or systems may be integrated with the computing device 610 or may be a separate component or system that is in communication with the I/O subsystem 616 (e.g., over a network 646 or a bus connection). The illustrative ASR subsystem 634 and the illustrative OCR subsystem 636 are, illustratively, COTS systems that are configured to interface with the computing system 100.

The storage media 620 may include one or more hard drives or other suitable data storage devices (e.g., flash memory, memory cards, memory sticks, and/or others). In some embodiments, portions of the computing system 100, e.g., the front end modules 618 and/or the multimedia inputs 102, the visual presentation 120, the NL description 122, the algorithms 130, the knowledge base 132, the templates 142, 144, and/or other data, reside at least temporarily in the storage media 620. Portions of the computing system 100, e.g., the multimedia inputs 102, the visual presentation 120, the NL description 122, the algorithms 130, the knowledge base 132, the templates 142, 144, and/or other data may be copied to the memory 614 during operation of the computing device 610, for faster processing or other reasons.

The communication subsystem 644 communicatively couples the user computing device 610 to one or more other devices, systems, or communication networks, e.g., a local area network, wide area network, personal cloud, enterprise cloud, public cloud, and/or the Internet, for example. Accordingly, the communication subsystem 644 may include one or more wired or wireless network interface software, firmware, or hardware, for example, as may be needed pursuant to the specifications and/or design of the particular embodiment of the system 100.

The display device 680, the camera 682, and the server computing device 650 each may be embodied as any suitable type of computing device or personal electronic device capable of performing the functions described herein, such as any of the aforementioned types of devices or other electronic devices. For example, in some embodiments, the server computing device 650 may operate a "back end" portion 658 of the multimedia content assistant computing system 100. The server computing device 650 may include one or more server computers including storage media 660, which may be used to store portions of the computing system 100, such as the back end modules 658 and/or portions of the multimedia inputs 102, the visual presentation 120, the NL description 122, the algorithms 130, the knowledge base 132, the templates 142, 144, and/or other data. The illustrative server computing device 650 also includes an HCI subsystem 670, and a communication subsystem 672. In general, components of the server computing device 650 having similar names to components of the computing device 610 described above may be embodied similarly. Further, each of the devices 680, 682 may include components similar to those described above in connection with the user computing device 610 and/or the server computing device 650. The computing system 100 may include other components, sub-components, and devices not illustrated in FIG. 6 for clarity of the description. In general, the components of the computing system 100 are communicatively coupled as shown in FIG. 6 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a computing system for understanding content of a video is configured to: algorithmically extract one or more visual features and one or more audio features from a video using one or more models training using machine learning techniques; determine an audio concept evidenced by the one or more extracted audio features; determine a visual concept evidenced by the one or more extracted visual features; access a knowledge base that defines events, associates different combinations of visual features, audio features, textual features, audio concepts and visual concepts with different events, and defines semantic relationships between the visual features, audio features, textual features, audio concepts, and visual concepts associated with the events; with the knowledge base, determine a semantic relationship between at least the audio concept and the visual concept; and recognize a salient event depicted in at least a portion of the video based at least partly on the semantic relationship between the audio concept and the visual concept.

An example 2 includes the subject matter of example 1, and is configured to algorithmically detect at least one prosodic feature of an audio segment of the video and determine the audio concept based on the at least one prosodic feature. An example 3 includes the subject matter of example 1 or example 2, and is configured to recognize the salient event based on a prosodic feature. An example 4 includes the subject matter of any of examples 1-3, and is configured to segment the video into a plurality of temporal segments, and determine the audio concept based on audio features extracted from at least one of the segments. An example 5 includes the subject matter of any of examples 1-4, configured to incorporate the portion of the video depicting the salient event into a video clip. An example 6 includes the subject matter of example 5, and is configured to communicate the video clip to another computing device over a network. An example 7 includes the subject matter of example 5, and is configured to one or more of: (i) interactively edit the video clip and (ii) automatically edit the video clip. An example 8 includes the subject matter of any of examples 1-7, and is configured to generate a natural language description of the salient event. An example 9 includes the subject matter of any of examples 1-8, and is configured to determine the audio concept using one or more audio concept detectors trained by a machine-learning technique or to determine the visual concept using one or more visual concept detectors trained by a machine-learning technique or recognize the salient event using one or more detectors trained by a machine-learning technique.

In an example 10, a method for understanding content of a video includes, by a computing system comprising one or more computing devices: algorithmically extracting one or more visual features and one or more audio features from a video; determining an audio concept evidenced by the one or more extracted audio features; determining a visual concept evidenced by the one or more extracted visual features; accessing a knowledge base that defines semantic relationships between different combinations of visual features, audio features, textual features, audio concepts, and visual concepts; with the knowledge base, determining a semantic relationship between at least the audio concept and the visual concept; recognizing a salient event depicted in at least a portion of the video based at least partly on the semantic relationship between the audio concept and the visual concept; and arranging the salient events according to a saliency criterion.

An example 11 includes the subject matter of example 10, and includes detecting at least one prosodic feature of an audio segment of the video and determine the audio concept based on the at least one prosodic feature. An example 12 includes the subject matter of example 10 or example 11, and includes recognizing the salient event based on a prosodic feature. An example 13 includes the subject matter of any of examples 10-12, and includes segmenting the video into a plurality of temporal segments, and determining the audio concept based on audio features extracted from at least one of the segments. An example 14 includes the subject matter of any of examples 10-13, and includes incorporating the portion of the video depicting the salient event into a video clip. An example 15 includes the subject matter of example 14, and is configured to communicate the video clip to another computing device over a network. An example 16 includes the subject matter of example 14, and includes one or more of: (i) interactively editing the video clip and (ii) automatically editing the video clip. An example 17 includes the subject matter of any of examples 10-16, and includes generating a natural language description of the salient event.

In an example 18, one or more machine accessible storage media includes instructions executable by at least one processor to: algorithmically extract one or more visual features and one or more audio features from a video; determine an audio concept evidenced by the one or more extracted audio features; determine a visual concept evidenced by the one or more extracted visual features; access a knowledge base that defines semantic relationships between different combinations of visual features, audio features, audio concepts, and visual concepts; with the knowledge base, determine a semantic relationship between at least the audio concept and the visual concept; recognize a salient event depicted in at least a portion of the video based at least partly on the audio concept and the visual concept; and generate a visual presentation of the salient event according to a pre-defined presentation template.

An example 19 includes the subject matter of example 18, and includes instructions to detect at least one prosodic feature of an audio segment of the video and recognize the salient event based on the at least one prosodic feature. An example 20 includes the subject matter of example 18 or example 19, and is configured to incorporate the portion of the video depicting the salient event into a video clip. An example 21 includes the subject matter of example 20, and is configured to communicate the video clip to another computing device over a network.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A computing system for understanding content of a video, the computing system configured to:
    algorithmically extract one or more visual features, one or more audio features and one or more textual features from the video using a plurality of detection algorithms;
    determine an audio concept evidenced by the one or more extracted audio features;
    determine a visual concept evidenced by the one or more extracted visual and audio features;
    access a knowledge base that defines events and maintains a mapping of relationships between different combinations of visual features, audio features, textual features, audio concepts and visual concepts with different ones of the events, wherein the mapping is based on semantic descriptions of the features and concepts defined by a plurality of models trained using one or more machine learning techniques;
    with the knowledge base, determine a semantic relationship between at least the audio concept and the visual concept as defined by the mapping; and
    recognize a salient event depicted in at least a portion of the video based at least partly on the semantic relationship between the audio concept and the visual concept and an event definition in the knowledge base.

2. The computing system of claim 1, configured to algorithmically detect at least one prosodic feature of an audio segment of the video and determine the audio concept based on the at least one prosodic feature.

3. The computing system of claim 1, configured to recognize the salient event based on a prosodic feature.

4. The computing system of claim 1, configured to segment the video into a plurality of temporal segments, and determine the audio concept based on audio features extracted from at least one of the segments.

5. The computing system of claim 1, configured to incorporate the portion of the video depicting the salient event into a video clip.

6. The computing system of claim 5, configured to communicate the video clip to a computing device over a network.

7. The computing system of claim 5, configured to one or more of: (i) interactively edit the video clip and (ii) automatically edit the video clip.

8. The computing system of claim 1, configured to generate a natural language description of the salient event.

9. The computing system of claim 1, configured to determine the audio concept using one or more audio concept detectors trained by a machine-learning technique or to determine the visual concept using one or more visual concept detectors trained by a machine-learning technique or recognize the salient event using one or more detectors trained by a machine-learning technique.

10. A method for understanding content of a video, the method comprising, by a computing system comprising one or more computing devices:
- algorithmically extracting one or more visual features and one or more audio features from a video;
- determining an audio concept evidenced by the one or more extracted audio features;
- determining a visual concept evidenced by the one or more extracted visual features;
- accessing a knowledge base that defines events and maintains a mapping of relationships between different combinations of visual features, audio features, textual features, audio concepts, and visual concepts with different ones of the events, wherein the mapping is based on semantic descriptions of the features and concepts defined by a plurality of models trained using one or more machine learning techniques;
- with the knowledge base, determining a semantic relationship between at least the audio concept and the visual concept as defined by the mapping;
- recognizing a plurality of salient events depicted in at least a portion of the video based at last partly on the semantic relationship between the audio concept and the visual concept and an event definition in the knowledge base; and
- arranging the salient events according to a saliency criterion.

11. The method of claim 10, comprising detecting at least one prosodic feature of an audio segment of the video and determine the audio concept based on the at least one prosodic feature.

12. The method of claim 10, comprising recognizing the salient event based on a prosodic feature.

13. The method of claim 10, comprising segmenting the video into a plurality of temporal segments, and determining the audio concept based on audio features extracted from at least one of the segments.

14. The method of claim 10, comprising incorporating the portion of the video depicting the salient event into a video clip.

15. The method of claim 14, configured to communicate the video clip to another computing device over a network.

16. The method of claim 14, comprising one or more of: (i) interactively editing the video clip and (ii) automatically editing the video clip.

17. The method of claim 10, comprising generating a natural language description of the salient event.

18. One or more non-transitory machine accessible storage media comprising instructions executable by at least one processor to:
- algorithmically extract one or more visual features and one or more audio features from a video;
- determine an audio concept evidenced by the one or more extracted audio features;
- determine a visual concept evidenced by the one or more extracted visual features;
- access a knowledge base that defines events and maintains a mapping of relationships between different combinations of visual features, audio features, audio concepts, and visual concepts with different ones of the events, wherein the mapping is based on semantic descriptions of the features and concepts defined by a plurality of models trained using one or more machine learning techniques;
- with the knowledge base, determine a semantic relationship between at least the audio concept and the visual concept as defined by the mapping;
- recognize a salient event depicted in at least a portion of the video based at least partly on the semantic relationship between the audio concept and the visual concept and an event definition in the knowledge base; and
- generate a visual presentation of the salient event according to a pre-defined presentation template.

19. The one or more machine accessible storage media of claim 18, comprising instructions to detect at least one prosodic feature of an audio segment of the video and recognize the salient event based on the at least one prosodic feature.

20. The method of claim 18, comprising incorporating the portion of the video depicting the salient event into a video clip.

21. The method of claim 20, configured to communicate the video clip to a computing device over a network.

* * * * *